UNITED STATES PATENT OFFICE.

MAX BUCHNER, OF HEIDELBERG, GERMANY, ASSIGNOR, BY MESNE ASSIGNMENTS, TO THE CHEMICAL FOUNDATION, INC., A CORPORATION OF DELAWARE.

PROCESS FOR DEPOSITING HYDRATE OF ALUMINA AND SIMILAR GELATINOUS PRECIPITATES FROM THEIR SALTS.

1,337,191.          Specification of Letters Patent.     Patented Apr. 20, 1920.

No Drawing. Application filed January 27, 1915, Serial No. 4,747. Renewed June 26, 1919. Serial No. 306,800½.

*To all whom it may concern:*

Be it known that I, Dr. MAX BUCHNER, a subject of the Grand Duchy of Baden, Germany, residing at Heidelberg, Baden, Germany, Brunnengasse No. 14, have invented certain new and useful Improvements in Processes for Depositing Hydrate of Alumina and Similar Gelatinous Precipitates from their Salts; and I do hereby declare the following to be a full, clear, and exact description of the invention, such as will enable others skilled in the art to which it appertains to make and use the same.

My invention relates to improvements in the process of separating hydrate of alumina and similar slimy deposits, and the object of the improvements is to provide a process whereby the deposits are obtained in a form which can easily be filtered and washed.

As is known to those skilled in the art hydrate of alumina and similar hydroxids which are precipitated in the usual way by means of alkali from suitable salt solutions are deposited in gelatinous form. The colloidal deposits can not easily be filtered, they absorb the salts and parts of the liquid, and it is difficult to clean the same by washing.

I have found, that these difficulties are avoided by using solid salts in lieu of the salt solutions and causing alkali solution or ammonia solution or gaseous ammonia to act thereon. The process can be carried out in such a way, that the alkalin precipitating medium is added to the solid salt, or in such a way that the granular metal salt is brought into the precipitating liquid.

My invention consists in producing hydroxids of the metals from solid salts. The metals to which my invention more particularly relates are aluminium, beryllium, and other earths, magnesium, zinc, copper, the metals of the iron group, and generally all the metals which are liable to form slimy hydroxids.

To the solid metal salt alkali lye or ammonia solution is added and it is allowed to stand in a cold or warm state. When heated the reaction takes place more rapidly. But when carrying out the process in the cold, and allowing the mixture to stand for some time, the deposit which is obtained when heating is in the form of particularly large granules. It is a characteristic feature of all the modifications of my improved method, that the deposits are in the form of a granular sandy mass which can easily be filtered and washed.

Where it is possible, ammonia is used as a precipitating medium. When using gaseous ammonia the metal salt is moistened a little and pure ammonia or waste gases containing ammonia, such for example as Mond gas or gases obtained from the coking processes, are passed in contact with the moistened salt. The process in which gaseous ammonia is used is particularly effective. When using both liquid and gaseous ammonia the amount of liquid which is necessary is particularly small.

In order that my invention be more clearly understood, I shall describe the same with reference to aluminium.

To the aluminium salts to be subjected to the process, such for example as sulfate or chlorid of aluminium, aqueous ammonia solution of from 15 to 20% is added. The mixture is heated, while regenerating the ammonia which might be vaporized by suitable apparatus such for example as cooling apparatus. After some time the reaction is completed and the ammonium salt solution is filtered off and the ammonium salts which adhere to the hydrate are washed out.

I have found, that a hydrate of alumina which can well be cleaned is obtained, when the aluminium salt which is mixed or moistened with ammonia solution is allowed to stand for a while, for example during the night, and the mixture is heated thereafter. In this case the liquid develops foam and from the foam a deposit of hydrate of alumina is directly separated which can easily be filtered and washed.

If for moistening very large amounts of aluminium salts small amounts of liquid ammonia are used which do not contain enough ammonia for completely precipitating the hydrate of alumina, the amount of ammonia which is necessary for precipitating the hydrate of alumina can be added by adding gaseous ammonia. Thereby a state of highest concentration is produced which is most favorable for obtaining a hydrate of alumina which can easily be filtered and washed. The same state of concentration can be produced by merely moistening the aluminium salt with water or adding water to the said salt, and thereafter adding gaseous ammonia. In lieu of the gaseous ammonia diluted ammoniacal crude gases, such as Mond gas or waste gases from coking processes, may be used.

Those skilled in the art might assume, that by carrying out the reaction in such a state of unusually high concentration the hydrate of alumina prevents the complete reaction between the acid of the aluminium salts and the ammonia acting thereon, or results in the formation of large amounts of ammonium salts which can not easily be washed out. However, my experiments have shown, that this is not the case, and that there is a complete reaction between the metal salts and the ammonia. The hydrate of aluminium is precipitated in a granular or bulbous form and seems to be highly porous, and the adhering ammonium salts can easily and completely be washed out. The same conditions apply to the other metal salts to which my invention relates. In the case of aluminium my invention is particularly important when applying the same to argillaceous materials and other materials containing aluminium which have been dissolved by acids.

If the salts from which the hydroxids are obtained are liable to melt in their water of crystallization, they are treated in the molten state by means of solid or gaseous precipitating media.

For example when heating crystallized sulfate of aluminium, the said sulfate is gradually dissolved in its water of crystallization, and after some time a clear product is obtained to which gaseous ammonia can directly be added. The hydrate of aluminium is directly precipitated, and the said hydrate is distinguished by high porosity and a certain degree of dryness, and it can easily be washed out and filtered.

Small amounts of water which are vaporized during the reaction can be replaced by adding a little steam together with the ammonia.

In a similar way as the hydrate of alumina can be obtained by treating the sulfate of aluminium which is melted in its water of crystallization with gaseous ammonia, it can be obtained by adding metal oxids, such for example as solid hydroxid of sodium, potassium, or magnesium, to the chlorid of aluminium which has been melted in its water of crystallization. In case of salts which contain very much water the oxids are sufficient, because they can be hydrated when being melted. Also in this case the molten product can be prevented from becoming thick, by reason of the water being vaporized, by adding steam.

Another means to avoid the loss of water consists in adding to the molten salt the solid precipitating media in a mixed state and with a little water.

I claim herein as my invention:

1. The process of precipitating non-colloidal metal hydroxids from salts of those metals that produce colloidal hydroxids, which comprises effecting a substantially dry reaction between such salt and an alkali, thereby obtaining a hydrate that can be readily filtered and washed.

2. The process of precipitating non-colloidal metal hydroxids from salts of those metals that produce colloidal hydroxids, which comprises effecting a substantially dry reaction between a salt of such a metal and the alkali, ammonia gas.

3. The process of precipitating non-colloidal hydroxids from salts of those metals that produce colloidal hydroxids, which comprises effecting a substantially dry reaction between a salt of such a metal and an alkali and water, the water being at least sufficient to replace water of crystallization.

4. The process of precipitating non-colloidal hydroxids from salts of metals that produce colloidal hydroxids, which comprises reacting on a salt of such a metal with ammonia and water sufficient to form a substantially dry non-colloidal hydroxid.

5. Process for precipitating non-colloidal metal hydroxids from salts of those metals that produce colloidal hydroxids, which comprises reacting on the salt with the alkali, ammonia, and water in the form of steam sufficient to precipitate the non-colloidal hydroxid.

6. Process for precipitating non-colloidal metal hydroxids from salts of those metals that produce colloidal hydroxids, which comprises melting the salt and precipitating non-colloidal hydroxid therefrom by alkali.

7. Process for precipitating non-colloidal metal hydroxids from salts of those metals that produce colloidal hydroxids, which comprises melting the salt and precipitating non-colloidal hydroxid therefrom by the alkali, ammonia.

8. Process for precipitating non-colloidal metal hydroxids from salts of metals that form colloidal hydroxids, which comprises melting the salt and treating the molten salt with gaseous ammonia in the presence of water sufficient to form the non-colloidal hydroxid.

9. Process for precipitating non-colloidal metal hydroxids from salts of metals that form colloidal hydroxids, which comprises reacting upon the molten salt with ammonia and steam sufficient to precipitate the non-colloidal hydroxid.

10. Process for precipitating non-colloidal metal hydroxids from salts of those metals that produce colloidal hydroxids, which comprises reacting on the molten salt with alkali in the presence of steam sufficient to precipitate the non-colloidal hydroxid.

In testimony that I claim the foregoing as my invention, I have signed my name in presence of two subscribing witnesses.

DR. MAX BUCHNER.

Witnesses:
   Dr. NAUEN,
   ANDREAS HEER.